(No Model.)
A. M. MITCHELL.
AIR DISTRIBUTING FAN.
No. 506,059. 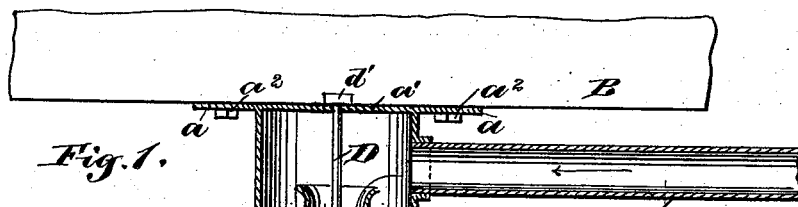 Patented Oct. 3, 1893.
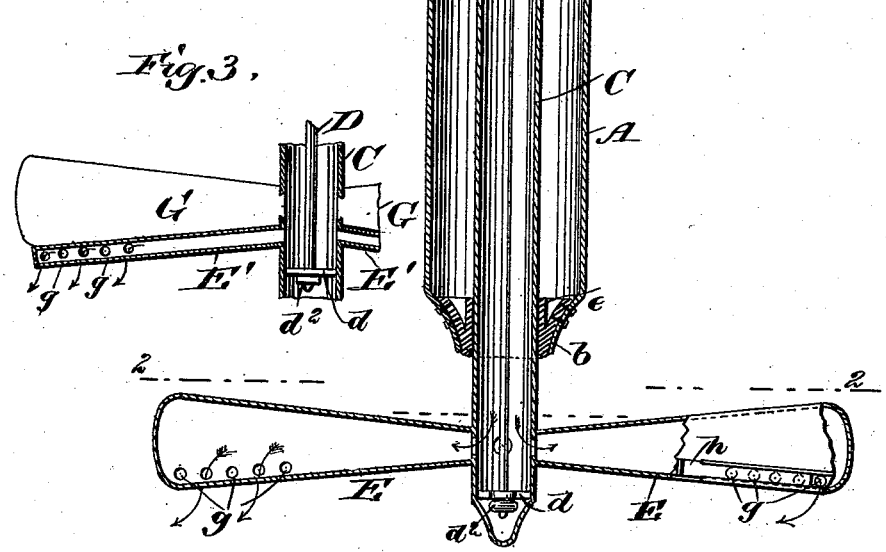
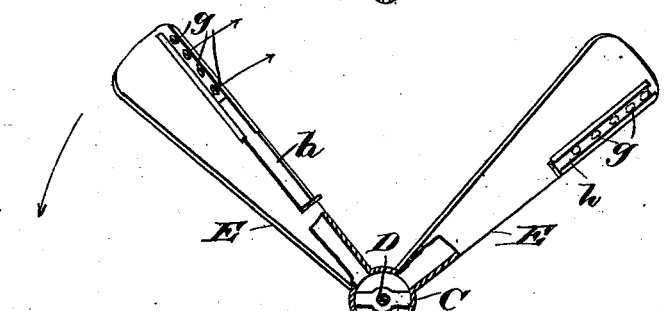
WITNESSES:
F. McArdle
C. Sedgwick
INVENTOR:
A. M. Mitchell
BY Munn & Co
ATTORNEYS

UNITED STATES PATENT OFFICE.

ARDON M. MITCHELL, OF BROOKLYN, NEW YORK.

AIR-DISTRIBUTING FAN.

SPECIFICATION forming part of Letters Patent No. 506,059, dated October 3, 1893.

Application filed April 8, 1892. Serial No. 428,352. (No model.)

*To all whom it may concern:*

Be it known that I, ARDON M. MITCHELL, of Brooklyn, in the county of Kings and State of New York, have invented a new and useful Air-Distributing Fan, of which the following is a full, clear, and exact description.

My invention relates to improvements in fans of a class used to create air currents in an apartment, for ventilation and to disperse insects; and has for its object to provide a novel, simple and efficient ventilating fan, that is adapted for rotation by pneumatic pressure and air escape from within the device, whereby pure air is distributed in a room or building, ordinary driving mechanism is dispensed with, a greater circulation of air is attained with a given expenditure of force, and a reduction of temperature is afforded by the actuating medium.

A further object is to provide the fan with means to control its speed of rotation, and regulate the escape of air currents therefrom.

To these ends, my invention consists in the construction and combination of parts, as is hereinafter described and indicated in the claims.

Reference is to be had to the accompanying drawings, forming a part of this specification, in which similar letters of reference indicate corresponding parts in all the figures.

Figure 1 is a side view, partly in section, showing the device suspended from a fixed support. Fig. 2 is a plan view, partly in section, taken on the line 2—2 in Fig. 1, with portions broken away; and Fig. 3 is a broken, partly sectional side view of the lower portion of the device, showing a modified form of the fan blades.

The improved system of ventilation consists in the introduction of air under pressure from without a building or room, into a receptacle which is a portion of a fan located in said apartment and which serves to equalize pressure in the fan blades, and distributing the air so inducted in jets projected oppositely from the fan blades; which effects the rotation of the fan, and consequent agitation of air within the room by the movement of the fan, and also introduces a continuous fresh supply of pure air from without, which may be cooled or warmed by any preferred means, so as to regulate the temperature as well as effect the ventilation of the building or room therein. By preference, the degree of compression given to the air that is used for cooling and ventilation is such as will heat it, so as to destroy disease germs that may pervade the air, so that disinfection will be thereby effected.

The preferred means to carry into effect the improved method of ventilation is shown in Figs. 1 and 2, wherein A, represents a cylindrical chamber having a projecting flange $a$, at its upper end that is sealed by an integral head wall $a'$. The radial flange $a$, is perforated for the reception of bolts $a^2$, which retain the entire device suspended from a ceiling or similar elevated support B.

The lower end portion $b$ of the chamber A, is conically contracted and centrally apertured to afford a circular hole of proper diameter through which the hollow shaft C is inserted. Such a proportionate length is given to the shaft C, as will permit a portion to project below the chamber A, when in position therein, these parts being retained in connection by a hanger rod D, that passes through the head wall $a'$ centrally, and thence downwardly through a center perforation in a cross bar $c$, that is located within and near the open upper end of the shaft. The lower end portion of the hanger rod D, passes centrally through a cross bar $d$ that is affixed within and near the lower end of the hollow shaft, a head $d'$ above on the rod, and a nut or collar $d^2$ secured upon the end of the rod below the cross bar $d$, retaining the shaft concentrically suspended within the chamber A, free to revolve.

The upper, open end of the hollow shaft C, is preferably flared, the lower end being closed, and between the shaft body and conically contracted end portion $b$, of the chamber A, a leather or gum packing cup $e$, is introduced, which fills the annular space. As shown in Fig. 1, the ring cup $e$, has its outer wall secured by rivets or bolts to the conical wall of the chamber A, its inner wall being free to closely embrace the hollow shaft C, and seal the joint between these parts when air pressure is produced within the same.

Upon the portion of the hollow shaft C that extends below the chamber A, radial fan blades E project, and are secured thereto. As shown, four blades, opposite in pairs are provided, but the number may be changed if this is desired. Each of the blades E, is set at a right angle to the axis of the shaft C, and they are given a similar inclination of their bodies transversely considered. Preferably the fan blades E, are made hollow throughout their area, and of a light, strong material, the cavities within the blades being in communication with the interior of the hollow shaft C, that is perforated opposite each blade to provide such a connection between the blades and shaft.

There is a set of perforations g, formed in each fan blade E, along one edge of each, and near the outer end. Each series of perforations g, is provided with a sliding gate h, that is loosely secured upon the fan blade, and adapted for longitudinal adjustment, whereby all the perforations may be opened or any desired number closed. The series of perforations in fan blades that are oppositely projected from each other on the shaft C, are produced on edges of the blades that are lowest thereon and opposite, so that jets of air made to issue from the perforations of the blades will project therefrom in opposite directions, and consequently produce a rotary movement of the hollow shaft and radial blades, as indicated by arrows in Fig. 2.

Near the upper end of the chamber A, the air conduit pipe F, is connected to a branch or inlet on the chamber. Said conduit shown broken, is extended to any source of supply for air under proper pressure, and which may be heated, cooled, and purified by any approved means.

In operation, there being a sufficient number of the improved fans placed in position to effect a proper ventilation of an apartment, air under adequate pressure is introduced within the chamber A, of each fan, which permits the inducted air to slightly expand, and flow equally into each fan blade and issue therefrom in jets from the edges of the fan blades E, and cause their rotation, thus utilizing the fresh pure air inducted through the conduit pipe F, to revolve the fan blades, create air currents thereby, and cause a dissemination of the inducted air throughout the apartment. By an adjustment of the sliding gate valves h, the escape of air from each fan blade E, may be regulated, and the speed of rotation controlled.

In Fig. 3, the fan blades G shown, are made solid, and each blade is provided with a small air pipe E', that is located along an appropriate edge of the blade, said pipes having perforations in series near the outer end, and a gate to close them, so that air under pressure conveyed to the radial pipe E' of each fan blade through the hollow shaft C, whereon the blades are affixed, will cause a rotation of the fan blades and shaft in the same manner as is effected by the preferred construction of the blades first described.

Having thus described my invention, I claim as new and desire to secure by Letters Patent—

1. In a ventilating fan, a set of hollow perforated fan blades radiating from a hollow shaft supported to rotate in a pendent chamber, and adapted to receive air under pressure and deliver it to the fan blades, and means for controlling the escape of air from said blades, substantially as described.

2. In a ventilating fan, the combination, with a pendent chamber having an air supply pipe, of a hollow shaft supported to rotate in said chamber and fan blades radiating from the hollow shaft and adapted to receive air under pressure therefrom and deliver it in graduated jets from one edge of each fan blade, substantially as described.

3. In a ventilating fan, the combination with a pendent chamber, an air supply pipe therefor, and a pendent hanger rod within the chamber, of a hollow shaft rotatably supported by the hanger rod, radiating hollow fan blades on the hollow shaft below the chamber, each having a series of perforations along one edge, and a sliding gate for each fan blade adapted to close its perforations, substantially as described.

4. In a ventilating fan, the combination with a chamber closed at its upper end and securable pendent from a fixed support, a lateral air supply pipe therefor, and a cup packing ring below at the open end of the chamber, of a hollow shaft that is concentric with the chamber, a hanger rod pendent from the top wall of the chamber and loosely engaging central perforations in cross bars within the hollow shaft near each end, and a set of radial hollow fan blades perforated along one edge of each, and a jet-controlling device for each set of perforations, substantially as described.

ARDON M. MITCHELL.

Witnesses:
WM. P. PATTON,
E. M. CLARK.